United States Patent
Boss et al.

(10) Patent No.: US 9,717,993 B2
(45) Date of Patent: Aug. 1, 2017

(54) MONITORING USER DEMOGRAPHICS WITHIN A VIRTUAL UNIVERSE

(75) Inventors: Gregory J. Boss, Saginaw, MI (US);
Christopher J. Dawson, Arlington, VA (US); Rick A. Hamilton, II, Charlottesville, VA (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1578 days.

(21) Appl. No.: 12/342,217

(22) Filed: Dec. 23, 2008

(65) Prior Publication Data

US 2010/0161788 A1 Jun. 24, 2010

(51) Int. Cl.
| | | |
|---|---|---|
| *G06F 15/173* | (2006.01) |
| *A63F 13/79* | (2014.01) |
| *A63F 13/335* | (2014.01) |
| *A63F 13/40* | (2014.01) |
| *A63F 13/30* | (2014.01) |
| *A63F 13/61* | (2014.01) |

(52) U.S. Cl.
CPC .............. *A63F 13/79* (2014.09); *A63F 13/10* (2013.01); *A63F 13/12* (2013.01); *A63F 13/335* (2014.09); *A63F 13/61* (2014.09); *A63F 2300/5553* (2013.01); *A63F 2300/575* (2013.01)

(58) Field of Classification Search
None
See application file for complete search history.

(56) References Cited

U.S. PATENT DOCUMENTS

| 7,269,632 | B2 | 9/2007 | Edeker et al. | |
|---|---|---|---|---|
| 2002/0138607 | A1* | 9/2002 | O' Rourke et al. | 709/224 |
| 2002/0188678 | A1 | 12/2002 | Edecker et al. | |
| 2003/0126035 | A1* | 7/2003 | Kake et al. | 705/26 |
| 2003/0195735 | A1 | 10/2003 | Rosedale et al. | |
| 2005/0071306 | A1 | 3/2005 | Kruszewski et al. | |
| 2007/0288598 | A1 | 12/2007 | Edeker et al. | |
| 2008/0201321 | A1* | 8/2008 | Fitzpatrick et al. | 707/5 |
| 2008/0306817 | A1* | 12/2008 | Amidon et al. | 705/14 |

* cited by examiner

*Primary Examiner* — Daniel Sorkowitz
(74) *Attorney, Agent, or Firm* — William H. Hartwell; Maxine L. Barasch; Keohane & D'Alessandro PLLC

(57) ABSTRACT

An invention that provides discovery and transfer of assets in a virtual universe is provided. In one embodiment, there is an asset transfer utility, including an inventory component configured to display to a user within a virtual universe an inventory containing a plurality of assets owned by other users within the virtual universe, each of the plurality of assets listed anonymously. A search component is configured to search the inventory containing the plurality of assets. A selection component is configured to select a set of assets from the plurality of assets based on the search. A transfer component is configured to transfer the set of assets between the user and an owner of each of the set of assets.

19 Claims, 7 Drawing Sheets

MONITORING USER DEMOGRAPHICS WITHIN A VIRTUAL UNIVERSE

FIELD OF THE INVENTION

This invention relates generally to virtual universes and more specifically to monitoring user demographics in a virtual universe.

BACKGROUND OF THE INVENTION

Virtual universes (VUs) or virtual worlds are computer-based simulated environments intended for its users or residents to inhabit and interact via avatars, which are personas or representations of the users of the virtual universes. VUs are also known as metaverses or "3D Internet". These types of virtual universes are now most common in multiplayer online games, such as Second Life®, which is a trademark of Linden Research Inc. in the United States. Avatars in these types of virtual universes, which can number well over a million, have a wide range of business and social experiences. Other commercial VUs include, in addition to Second Life®, EverQuest, Ultima Online, Lineage or World of Warcraft.

Second Life® had over 1 million residents. Advertising is therefore important in Second Life®, and extends to the business, social and recreational aspects of the game. The managing of advertisements in these virtual worlds is vitally important. Since the creation of a virtual advertisement is relatively cheaper than in the real world (digital bits versus physical materials) more effort can be put into the content, location and audience. It is difficult for advertisers in the real world to provide dynamic advertisements due to the lack of information available to them on what visual impressions are being made and also the demographics of the person(s) receiving the advertisement.

SUMMARY OF THE INVENTION

Embodiments of this invention are directed to monitoring user demographics within a virtual universe, such that user demographics are monitored within a multidimensional grid. In these embodiments, a demographic tracking utility provides the capability to monitor user demographics within the virtual universe. The monitoring user demographics utility comprises a multidimensional component configured to monitor avatar usage across a given region within a virtual universe. The tracking avatar component maintains a database of relevant related characteristics of each avatar present in the given region. The monitoring and deriving component utilizes the database of relevant related characteristics and provides aggregate information based upon multiple avatars within the given region. The displaying component allows for entities to have access to the database of relevant related characteristics and the monitoring and deriving component output.

In one embodiment, there is a method for monitoring user demographics within a virtual universe. In this embodiment, the method comprises: overlaying a multidimensional grid on a region of the VU; tracking usage of an avatar within the region using the multidimensional grid; monitoring and deriving avatar usage information based on the tracked usage; and displaying the avatar usage information.

In a second embodiment, there is a computer system for monitoring avatar demographics within a virtual universe. In this embodiment, the computer system comprises at least one processing unit and memory operably associated with the at least one processing unit. A utility is storable in memory and executable by the at least one processing unit. The utility comprises: a module for overlaying a multidimensional grid on a region of the virtual universe; a module for tracking usage of an avatar within the region using the multidimensional grid; a module for monitoring and deriving avatar usage information based on the tracked usage; and a module for displaying the avatar usage information.

In a third embodiment, there is a computer-readable medium storing computer instructions, which when executed, enables a computer system to provide monitoring user demographics within a virtual universe. In this embodiment, the computer instructions comprise: a module for overlaying a multidimensional grid on a region of the virtual universe; a module for tracking usage of an avatar within the region using the multidimensional grid; a module for monitoring and deriving avatar usage information based on the tracked usage; and a module for displaying the avatar usage information.

In a fourth embodiment, there is a method for deploying a user demographic tracking utility for use in a computer system that monitors user demographics within a virtual universe. In this embodiment, a computer infrastructure is provided and is operable to: overlay a multidimensional grid on a region of the virtual universe; track usage of an avatar within the region using the multidimensional grid; monitor and derive avatar usage information based on the tracked usage; and display the avatar usage information.

Figure 1:
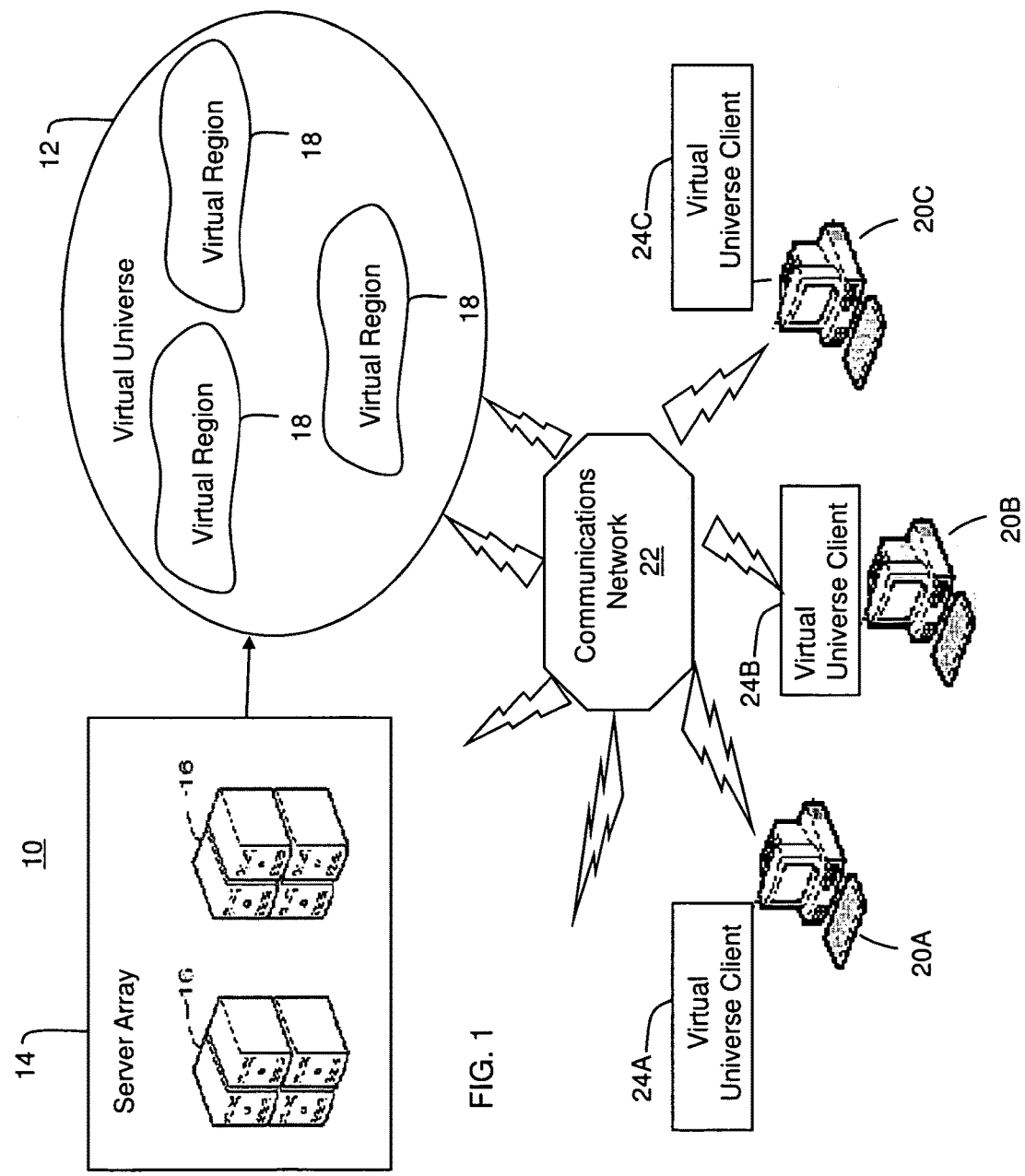
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to monitoring user demographics within a virtual universe, such that user demographics are monitored within a multidimensional grid. In these embodiments, a demographic tracking utility provides the capability to monitor user demographics within the multidimensional grid. The monitoring user demographics utility comprises a multidimensional component configured to monitor avatar usage across a given region within a virtual universe. The tracking avatar component maintains a database of relevant related characteristics of each avatar present in the given region. The monitoring and deriving component utilizes the database of relevant related characteristics and provides aggregate information based upon multiple avatars within the given region. The displaying component allows for entities to have access to the database of relevant related characteristics and the monitoring and deriving component output.

FIG. 1 shows a high-level schematic diagram showing a networking environment 10 for providing a virtual universe 12 according to one embodiment of this invention in which monitoring user demographics within the virtual universe can be utilized. As shown in FIG. 1, networking environment 10 comprises a server array or grid 14 comprising a plurality of servers 16 each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Like the real-world, each virtual region 18 within virtual universe 12 comprises a landscape having virtual content, such as buildings, stores, clubs, sporting arenas, parks, beaches, cities and towns all created by administrators or residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

One of the ways that users of virtual universe 12 can use virtual universe client 24 to interact with the universe is to view advertising content within the virtual universe. An illustrative but non-limiting listing of advertisements that can be viewed through virtual universe client 24 includes items such as billboards, store window display, etc. As will be further described herein, embodiments of this invention are directed to facilitating the management of these advertisements assets in virtual universe 12.

Figure 2:
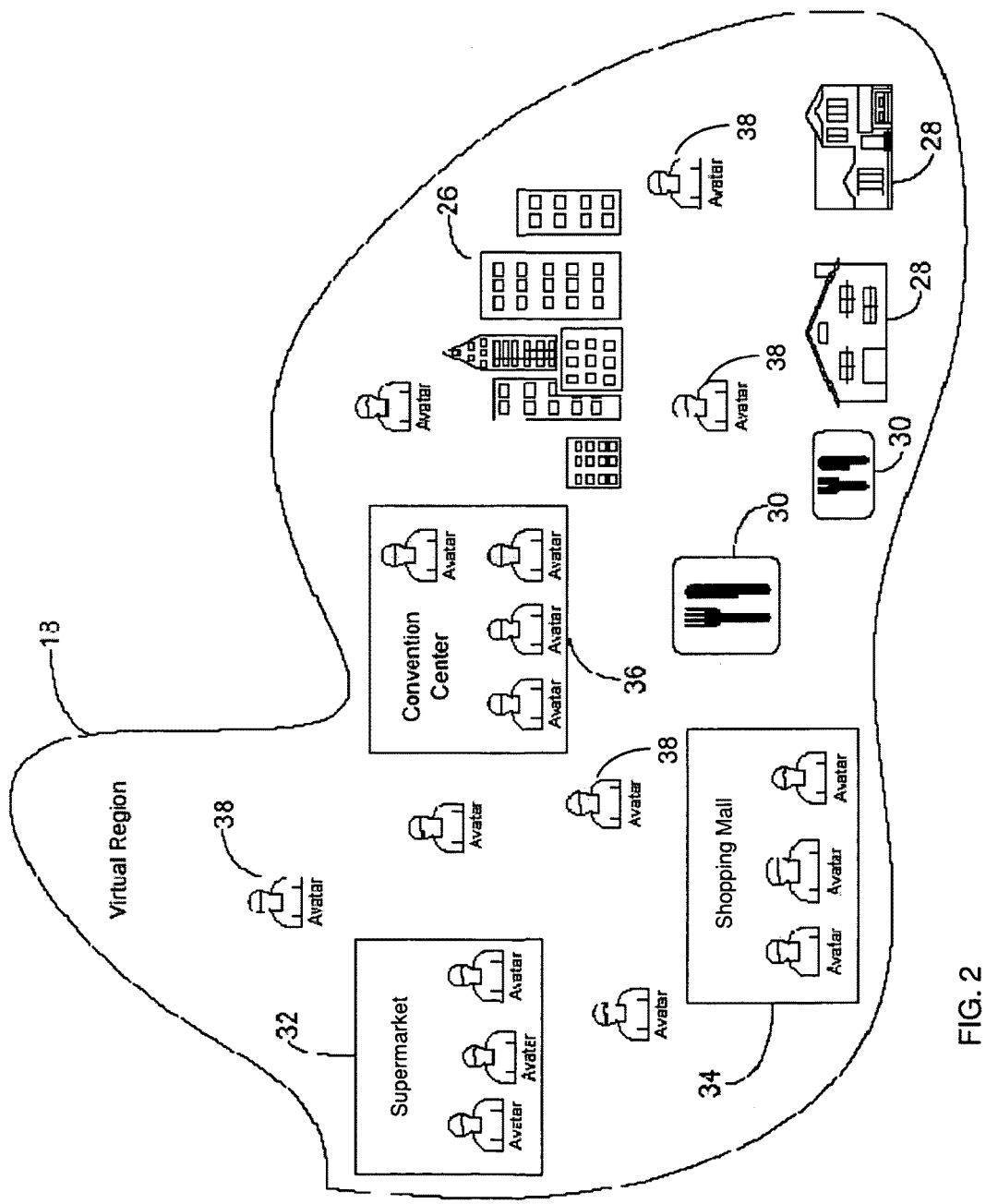
FIG. 2 shows a more detailed view of a virtual region shown in the virtual universe of FIG. 1.

FIG. 2 shows a more detailed view of what one virtual region 18 in virtual universe 12 may comprise. As an example, virtual region 18 shown in FIG. 2 comprises a downtown office center 26, homes 28, restaurants 30, a supermarket 32 and a shopping mall 34 for shopping, and a convention center 36 for meetings and various conventions. Residents or avatars 38, which as mentioned above, are personas or representations of the users of the virtual universe, roam all about the virtual region by walking, driving, flying or even by teleportation or transportation, which is essentially moving through space from one point to another, more or less instantaneously. These examples of virtual content in virtual region 18 shown in FIG. 2 are only illustrative of some items that may be found in a virtual region and those skilled in the art will recognize that these regions can have many more items that can be found in the real world universe as well as things that do not presently exist in the real world.

Figure 3:
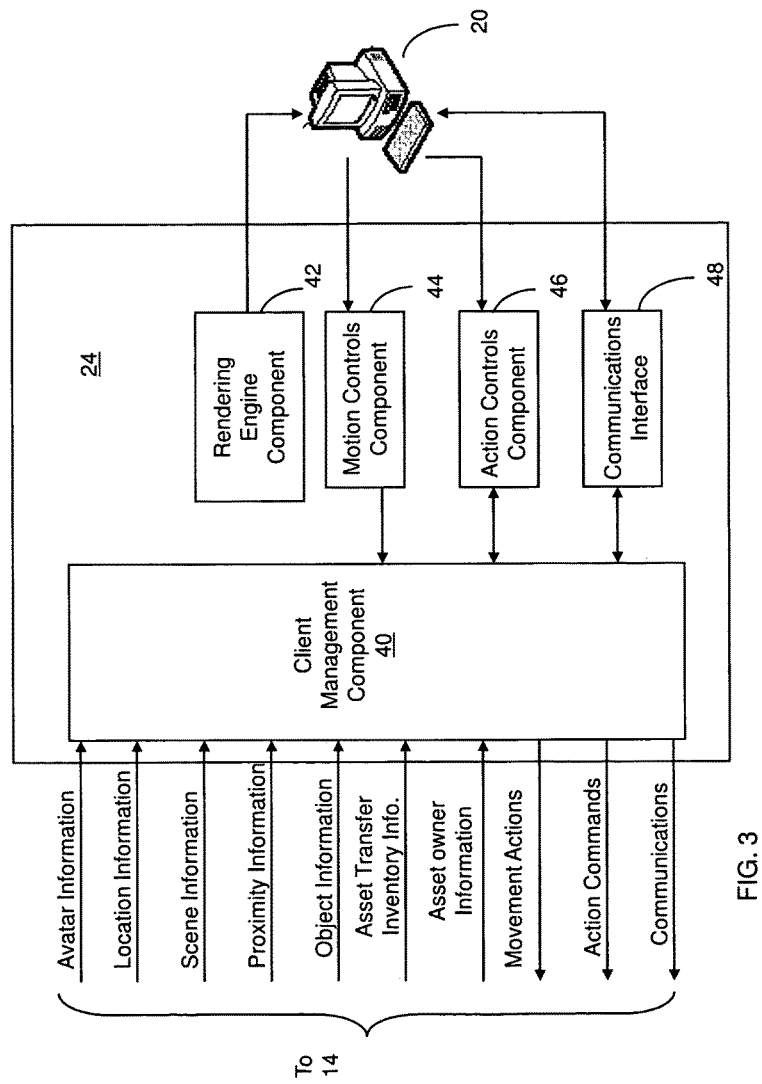
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, commands and communications made by a user through computer 20, and information received from the virtual universe through server array 14. A rendering engine component 42 enables the user of computer 20 to visualize his or her avatar within the surroundings of the particular region of virtual universe 12 that the avatar is presently located.

A motion controls component 44 enables the user's avatar(s) to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking and electronic mail (e-mail).

FIG. 3 shows the various types of information received by client management component 40 from the virtual universe through the server array 14. In particular, client management component 40 receives avatar information about the avatars that are in proximity to the user's avatar. In addition, client management component 40 receives location information about the area that the user's avatar is near (e.g., what region or island he or she is in), as well as scene information (e.g., what the avatar sees). Client management component 40 also receives proximity information, which contains information on what the user's avatar is near, and object information, which is information about nearby objects. Client management component 40 receives avatar and location information, which information is utilized by the demographic tracking utility 53. FIG. 3 also shows the movement commands and action commands that are generated by the user and sent to the server array via client management component 40, as well as the communications that can be sent to the users of other avatars within the virtual universe.

Figure 4:
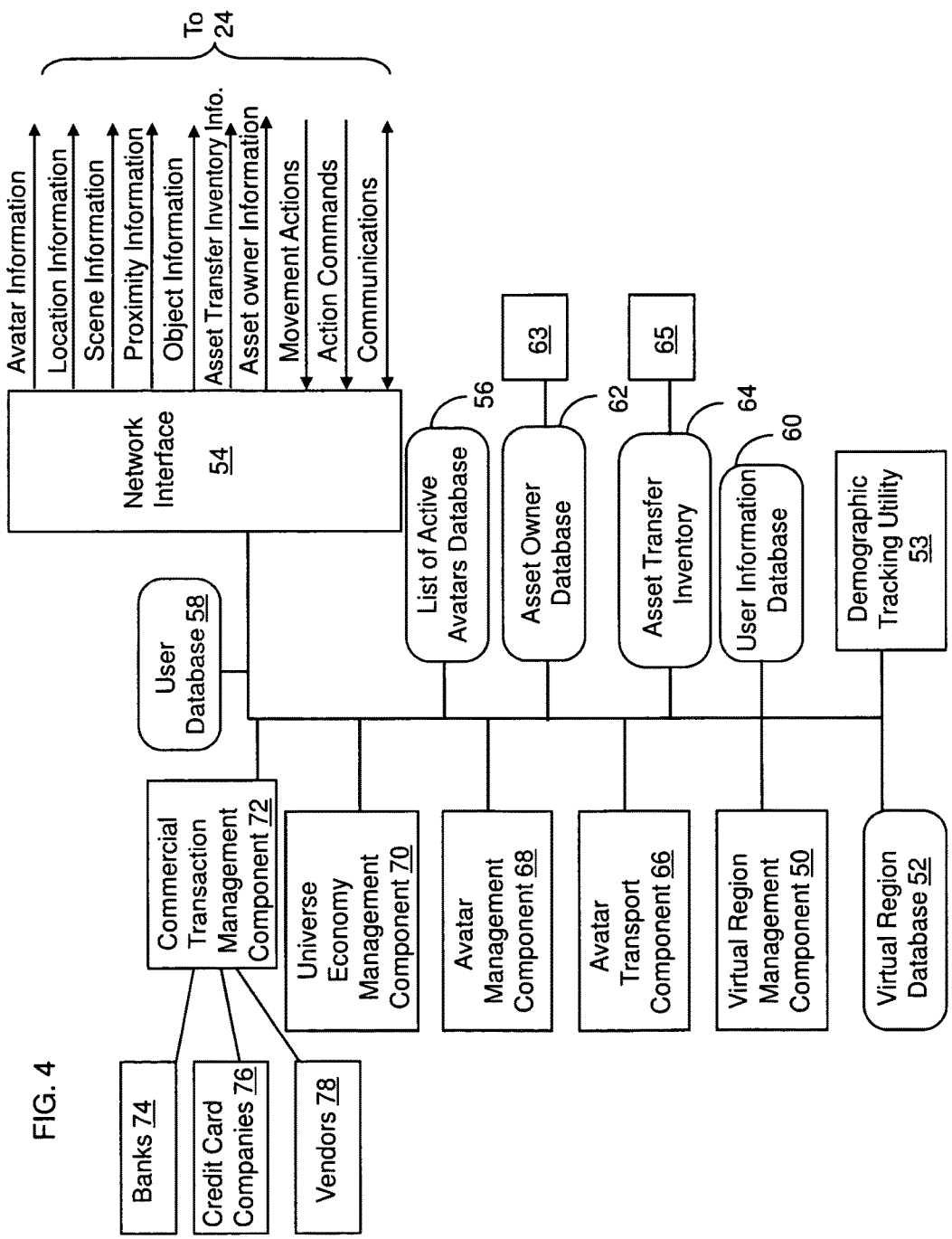
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates active avatar, location, scene, proximity, script, object, asset transfer inventory, asset owner, user database, and user information to the user through virtual universe client 24. The network interface receives movement and action commands, as well as communications from the user via virtual universe client 24.

FIG. 4 also shows a demographic tracking utility 53, which provides the capability to monitor user demographics in the virtual universe, as will be further described below. In this embodiment, demographic tracking utility 53 resides on the same computer system as server array 14, and communicates directly to virtual universe 12 and its users via virtual universe client 24. In other embodiments, demographic tracking utility 53 might reside on the same computer as virtual universe client 24, have components that reside on both server array 14 and virtual universe client 24, or reside on separate computers in direct communication with virtual universe servers 16 and virtual universe clients 24.

As shown in FIG. 4, there are several different databases for storing information. In particular, virtual region database 52 stores information on all of the specifics in virtual region 18 that virtual region management component 50 is managing. Virtual region database 52 contains metadata information about the objects, texts and scripts associated with the virtual content in the virtual region(s). Active avatars database 56 contains a list of all the avatars that are online in the virtual universe 12, while databases 58 and 60 contain information on the actual human users or avatars in the virtual universe 12. In one embodiment, user database 58 contains general information on the users such as names, email addresses, locales, interests, ages, preferences, etc., while user information database 60 contains more sensitive information on the users such as billing information (e.g., credit card information) for taking part in transactions.

Databases 52, 56, 58, 60 and 63 contain information on the avatars of the users that reside in virtual universe 12. In one embodiment, virtual region database 52, list of active avatars database 56, user database 58, user information database 60 and asset owner database 63 are tracked for avatars within a multidimensional space of the virtual region 18. The information is typically in the form of metadata associated with the virtual content of each user's avatar(s). An illustrative but non-limiting list of avatar usage information includes appearance, asset inventory, past activities and purchases. Those skilled in the art will recognize that this listing of avatar usage information is illustrative of possible items and is not exhaustive. For example, other user information may include name of the owner, e-mail address of the owner, the address of the originating computer, or any other type of user information.

Each user demographic may be associated with a piece of executable code or other data, called a script, which may affect rendering in some fashion during a session in the virtual universe. A clothing asset, for example, may be rendered with a script that causes the clothing to shimmer. A virtual pet, in another example, may render as an automated avatar that follows the user's avatar within the virtual universe.

Virtual region database 52, list of active avatars database 56, user database 58, user information database 60 and asset owner database 63 are databases that contain demographic information within demographic tracking utility 53. In an exemplary embodiment, asset transfer inventory 64 comprises a listing table 65 having a foreign key to an asset table 63 within asset owner database 62, such that querying the asset transfer inventory 64 pulls information from asset table 63 to listing table 65. Those skilled in the art will recognize that other techniques for transferring data between databases 52, 56, 58, 60 and 63 are possible within the scope of the invention.

Those skilled in the art will also recognize that databases 52-63 may contain additional information if desired. Databases 52-63 may be consolidated into a single database or table, divided into multiple databases or tables, or clustered into a database system spanning multiple physical and logical devices. Further, although the above information is shown in FIG. 4 as being stored in databases, those skilled in the art will recognize that other configurations and means of storing information can be utilized. For example, virtual region database 52, list of active avatars database 56, user database 58, user information database 60 and asset owner database 63 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to transport through space from one point to another point, instantaneously. As a result, an avatar could for example travel from a business region to an entertainment region to experience a concert.

An avatar management component 68 keeps track of what the avatars are doing while in the virtual universe. For example, avatar management component 68 can track where each avatar is presently located in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own VU currency ($VU) that users pay for with real-life money. The users can then take part in commercial transactions for their avatars through universe economy management component 70. For example, an avatar might want to pay for a service that provides discovery and transfer of assets within the virtual universe. In this case, the avatar would make the purchase of this service using the $VU. In some instances, the user may want to take part in a commercial transaction that benefits him or her and not an avatar. In this case, a commercial transaction management component 72 allows the user to participate in the transaction. For example, while walking around a commercial zone, a user may see a pair of shoes that he or she would like for themselves and not the user's avatar. In order to fulfill this type of transaction and others similarly related, commercial transaction management component 72 interacts with banks 74, credit card companies 76 and vendors 78.

Figure 5:
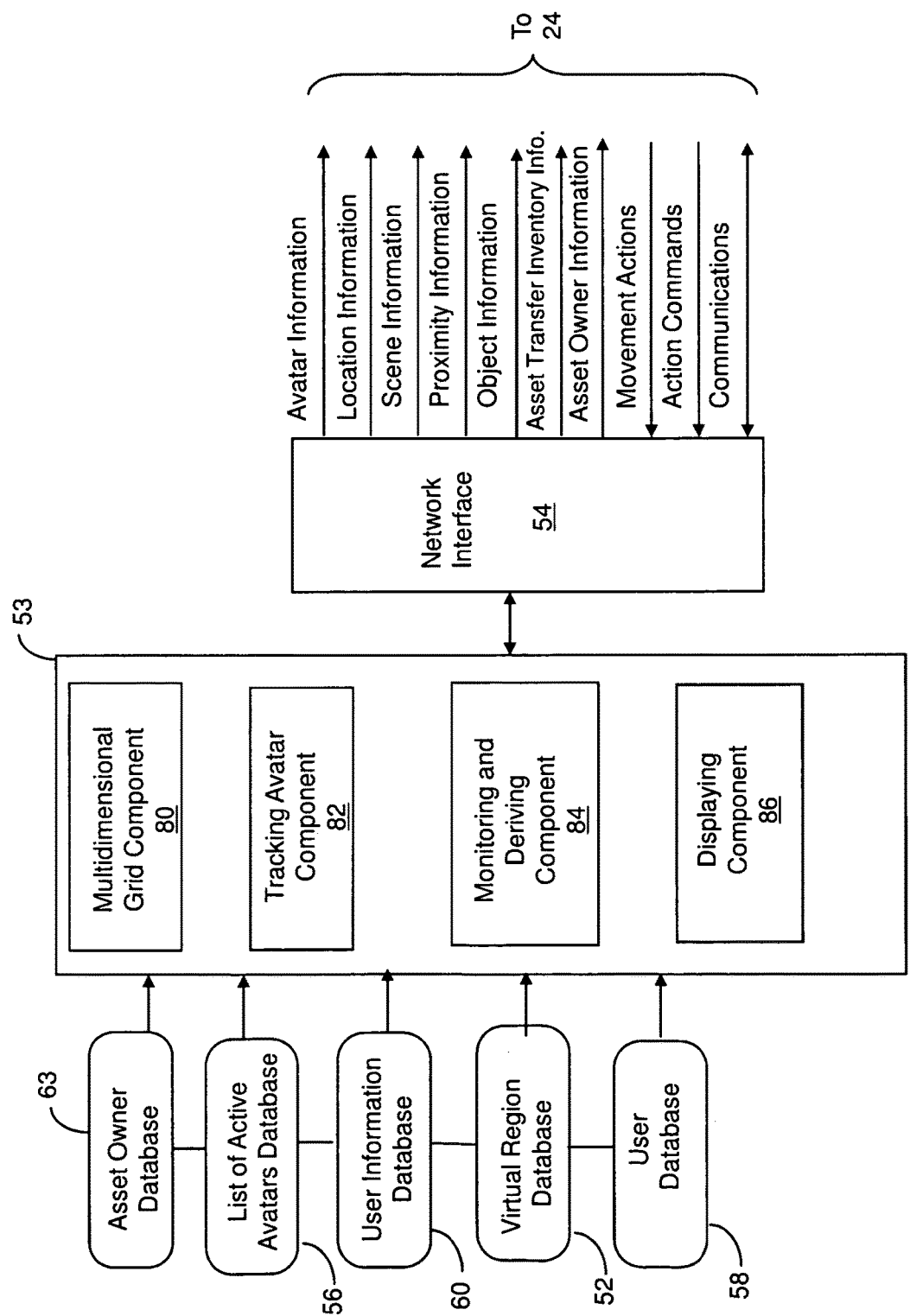
FIG. 5 shows a user demographic tracking utility according to one embodiment of this invention that operates in the environment shown in FIG. 1.

Referring now to FIG. 5, demographic tracking utility 53 according to embodiments of the invention will be described in further detail. As shown in FIG. 5, demographic tracking utility 53 comprises an multidimensional grid component 80 configured to layout a multidimensional grid within virtual universe 12 that may be two dimensional (similar to a two dimensional map where the land is divided up into multiple cells), three dimensional (similar to cubes of space including 2 dimensional location on the ground plus altitude), four dimensional (similar to a cubes of space plus an dimension such as time), or higher order dimensions.

Avatars within the multidimensional grid component 80 would be tracked by demographic tracking utility 53. All avatars within the multidimensional grid would be tracked. Depending upon how many avatars are present within the multidimensional grid, different actions could be taken. One example of such action, the addition of avatars caused by teleportation into an area can cause an immediate increase in the advertising costs of a sign, billboard, etcetera, in direct relation to the increase in the number of impressions made by that advertisement. In another example, the advertisements in this same region can be relocated to another region which has the targeted level of avatars present. In yet another example, the software program can match a cluster of avatars to a service level agreement associated with an advertisement so that relocation of an advertisement occurs to exactly match the parameters associated with that advertisement. In a four dimensional grid scenario, this advertising service may enable a potential advertiser to predict a time frame in the future for which a specific cube may contain a certain type or number of avatars. This 4-D grid may be a multi-resolution grid with unequal spacing such that there may be higher-resolution in space-time in some regions of the multidimensional grid and lower resolution in other regions.

In another embodiment, tracking avatar component 82 is configured to track each avatar by grid coordinate assigned to each cell and all avatars found within that cell are clustered together. A map of the multidimensional grid could be color coded so that more populated areas or areas that house avatars that meet a certain set of criteria could be identified.

In most virtual universes a grid coordinate system is already in place which tracks the exact location of all avatars and objects within the virtual universe. This grid overlay is different from the existing coordinate system in that it defines meaningful sized regions in relation to the effective impression area of a virtual advertisement. Multiple multidimensional grid overlays can be implemented for different classes of advertisements.

As shown in FIG. 5, demographic tracking utility 53 further comprises a monitoring and deriving component 84 configured to calculating the demographic information associated with the avatars within a specific area of the multidimensional grid cell. Multiple characteristics associated with avatars may be used to calculate a set of information that may be of use to a third party. For example, it may not be just the number of avatars in a specific cell that is of interest, rather it may be the number of avatars within the area that have remained there for the past 30 minutes and are between the ages of 15 and 30. This may be a high value cell for the placement of a new advertisement for a computer game.

To ensure accuracy of avatar counts, a third party service opportunity exists in the virtual universe 12. This third party may be included in the avatar management component 68 or via an outside agency. Such an avatar monitor agency (AMA) may monitor a sample of avatars and also use their travel patterns in a virtual universe 12 to extrapolate statistically relevant information for the virtual universe 12 as a whole. Such AMAs may count the number of avatars, monitor the demographics of the avatars, usage patterns and temporal changes in avatar visits. For example the usage patterns could be used to assess the popularity of a particular virtual universe location within a virtual region 18.

The AMA output may appear in a protected region of the virtual universe 12, in the virtual universe graphical user interface, or in a graphical user interface outside the virtual universe 12. These display methods could contain usage information and then let the user continue to make use of the virtual universe 12 in an unimpeded manner. For example, historical avatar counts could be shown above a translucent frame that could be moved around in the virtual universe 12. This frame, or graphical user interface, is owned and managed by an independent third party and it is associated with either an individual virtual universe region 18 being monitored or with an individual user's system. Routines for monitoring, aggregating and displaying information could be included in this AMA software. This tracking of demographics could be based on capturing IP packets, monitoring the activity at domain name servers, through the use of cookies, or through the use of user supplied information.

The demographic information utilized in the calculations of the monitoring and deriving component 84 may include appearance, inventory, past activities, past purchases, owner contact information, and time of day for peak web usage. Additional information that could be used to determine physical location in the real world and could be utilized are the address of the originating computer, internet protocol address, domain name or the path taken through the virtual universe.

The displaying component 86 would display the monitoring and deriving component 84 and tracking avatar component 82 output in real time with respect to a virtual universe region 18. This information would be viewable by all users or only by parties who obtain the rights to access this information.

Figure 6:
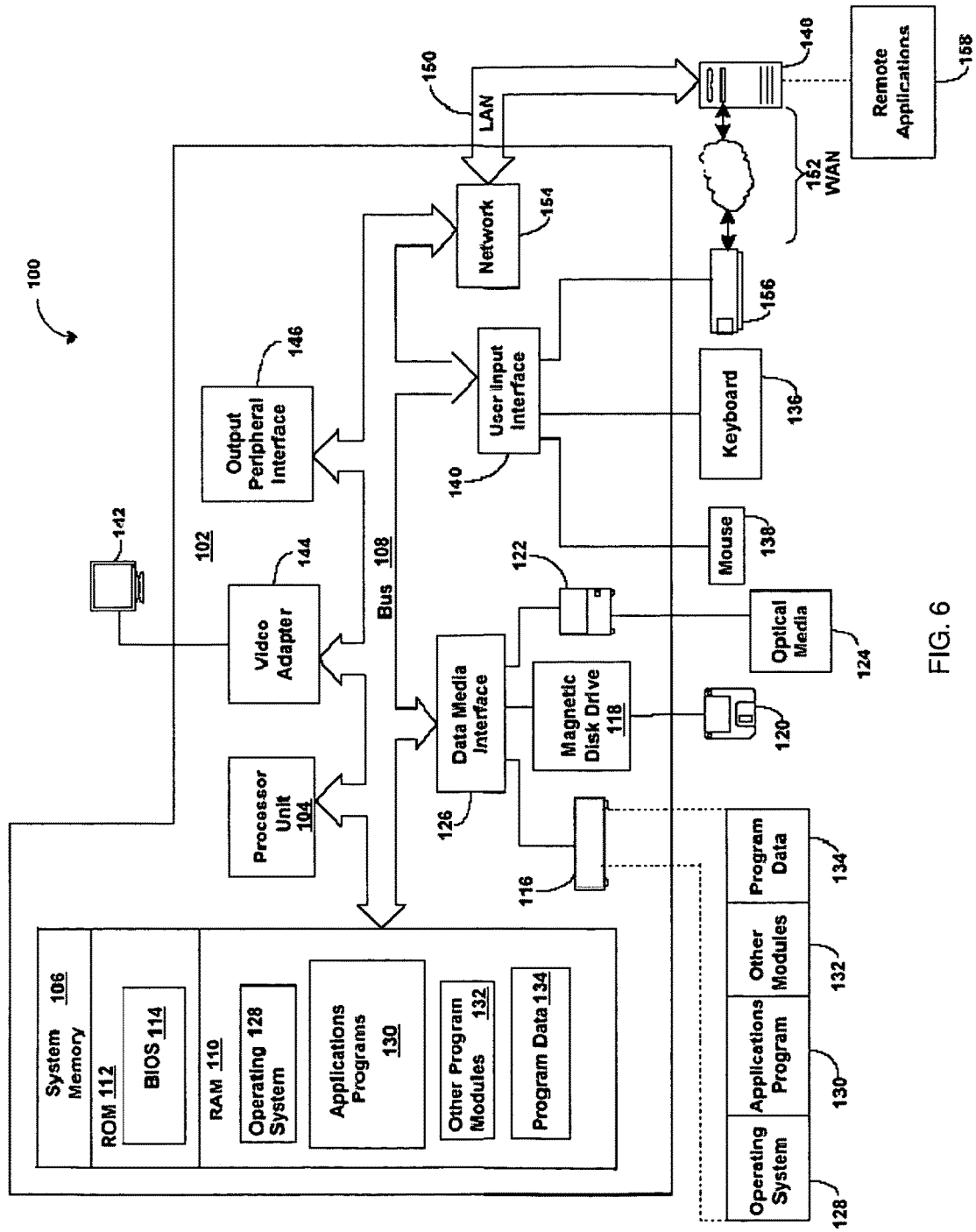
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the invention described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. Hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130 other program modules 132, and program data 134 or some combination thereof, may include an implementation of the networking environment 10 of FIG. 1 including server array 14 and virtual universe client 24. In one embodiment, the one or more application programs 130 include components of demographic tracking utility 53, such as multidimensional grid component 80, tracking avatar component 82, monitoring and deriving component 84, and displaying component 86.

Figure 7:
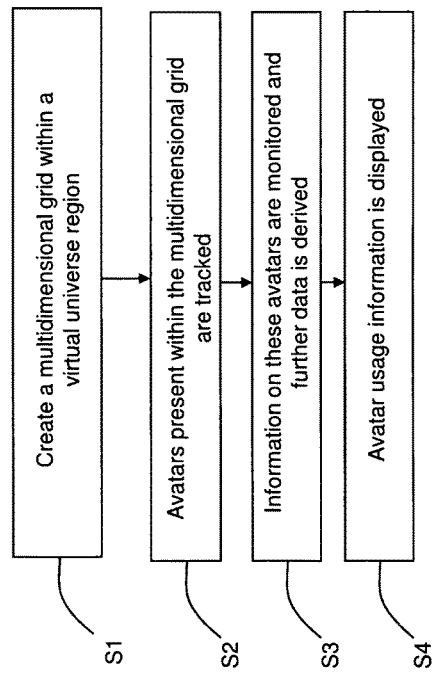
FIG. 7 shows a flow diagram of a method for monitoring user demographics in the virtual universe according to one embodiment of the invention.

The one or more program modules 130 carry out the methodologies disclosed herein, as shown in FIG. 7. According to one embodiment, in step S1, a multidimensional grid is created within virtual universe region. In S2, the avatars present within this multidimensional grid are tracked. In S3, information on the avatars being tracked is monitored and further data derived. In S4, the avatar usage information is displayed.

The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to system bus 108 via the user input interface 140 or other appropriate mechanism.

In a networked environment, program modules depicted relative to the personal computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

In another embodiment, the invention provides a business method that performs the process of the invention on a subscription, advertising, and/or fee basis. That is, a service provider, such as a Solution Integrator, could offer to provide the functionality discussed herein. In this case, the service provider can create, maintain, support, etc., a computer infrastructure, such as computer infrastructure 102 (FIG. 6) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for performing the functionality discussed herein. In this case, a computer infrastructure, such as computer infrastructure 102 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as processor unit 104 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

It is apparent that there has been provided with this invention a method for monitoring user demographics within a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A Virtual Universe (VU) method in a networked computing environment, the method comprising:

programming a demographic tracking utility, incorporated into a computer system of the networked computing environment hosting a VU, for overlaying a multidimensional grid on a region of the VU;

programming the demographic tracking utility, incorporated into the computer system, for partitioning the multidimensional grid into a plurality of cells each correlating in size to a multidimensional area of effective avatar impression surrounding a virtual advertisement;

programming the demographic tracking utility, incorporated into the computer system, for tracking usage of a set of avatars within the region using the multidimensional grid, wherein the usage of the set of avatars is implemented via client computing devices;

programming the demographic tracking utility, incorporated into the computer system, for monitoring and deriving avatar usage information based on the tracked usage of the set of avatars;

programming the demographic tracking utility, incorporated into the computer system, for aggregating and processing the avatar usage information to determine demographics data for a set of users of the set of avatars, wherein each datum of the demographics data is associated with a script affecting rendering of an avatar, associated with a user, of the set of users; and programming the demographic tracking utility, incorporated into the computer system, for displaying the multidimensional grid along with a representation of the effective avatar impression for each of the plurality of cells, which are dimensioned based on the avatar usage information and the aggregated demographics data, the representation of the effective avatar impression comprising one or more of the following: an overlay map that is that is color-coded according to a number of avatars within each of the plurality of cells, and a numerical graphic displaying the number of avatars within one or more of the plurality of cells;

wherein the computer system of the networked computing environment comprises:
- a server array comprising a plurality of servers each responsible for managing a portion of virtual content within the VU, and
- a set of databases comprising:
  - a virtual region database comprising demographic information about objects, texts, and scripts associated with the virtual content in the virtual region,
  - an active avatars database comprising a list of avatars, of the set of avatars, that are online in the virtual universe,
  - a user database comprising information on the set of users, the information comprising at least one of: names, email addresses, locales, interests, ages, and preferences,
  - a user information database comprising billing information for taking part in transactions, and
  - an asset owner database comprising information relating to ownership of assets in the VU.

2. The VU method according to claim 1, further comprising programming the demographic tracking utility, incorporated into the computer system, for recording a quantity of visits to the region.

3. The VU method according to claim 1, the step of deriving comprising programming the demographic tracking utility, incorporated into the computer system, for identifying a user of each of the set of avatars based on at least one of: an Internet Protocol (IP) address of a computer being used to control each of the set of avatars, an identity of the computer being used to control each of the set of avatars, and a path taken through the VU by each of the set of avatars.

4. The VU method according to claim 3, wherein the step of deriving demographic information of a user of each of the set of avatars is based on at least one of: an attribute of a user of each of the set of avatars, a hardware configuration of the computer being used to control each of the set of avatars, recent history of web pages visited, a time of day for peak web usage, and contact information.

5. The VU method according to claim 4, further comprising programming the demographic tracking utility, incorporated into the computer system, for deriving the demographic information of a user of each of the set of avatars from third party sources.

6. The VU method according to claim 1, the demographic data being used to determine the price paid by advertisers for advertisements on the VU location, or the price paid by the VU location owner or other entity for a referral or lead.

7. A computer system for tracking avatar demographics within a Virtual Universe (VU) system, comprising:
- at least one processing unit;
- memory operably associated with the at least one processing unit;
- a utility stored in the memory and executable by the at least one processing unit, the utility comprising:
  - a multidimensional grid having a set of uniquely configured hardware and software elements for:
    - overlaying a multidimensional grid on a region of the VU; and
    - partitioning the multidimensional grid into a plurality of cells each correlating in size to a multidimensional area of effective avatar impression surrounding a virtual advertisement;
  - a module having a set of uniquely configured hardware and software elements for tracking usage of an avatar within the region using the multidimensional grid, wherein the usage of the set of avatars is implemented via client computing devices;
  - a module having a set of uniquely configured hardware elements for monitoring and deriving avatar usage information based on the tracked usage;
  - a module having a set of uniquely configured hardware and software elements for aggregating and processing the avatar usage information to determine demographic data of a set of users of avatars, wherein each datum of the demographics data is associated with a script affecting rendering of an avatar, associated with a user, of the set of users; and
  - a module having a set of uniquely configured hardware and software elements for displaying the multidimensional grid along with a representation of the effective avatar impression for each of plurality of cells, which are dimensioned based on the avatar usage information and the aggregated demographics data, the representation of the effective avatar impression comprising one or more of the following: an overlay map that is that is color-coded according to a number of avatars within each of the plurality of cells, and a numerical graphic displaying the number of avatars within one or more of the plurality of cells; and
- a set of databases comprising:
  - a virtual region database comprising demographic information about objects, texts, and scripts associated with the virtual content in the virtual region,
  - an active avatars database comprising a list of avatars, of the set of avatars, that are online in the virtual universe,
  - a user database comprising information on the set of users, the information comprising at least one of: names, email addresses, locales, interests, ages, and preferences,
  - a user information database comprising billing information for taking part in transactions, and
  - an asset owner database comprising information relating to ownership of assets in the VU.

8. The computer system of claim 7, the module for tracking being configured to record a quantity of visits to the region.

9. The computer system of claim 7, the module for deriving being configured to identify a user of each of the set of avatars based on at least one of: an identity of a computer being used to control each of the set of avatars, an Internet Protocol (IP) address of the computer, or a path taken through the VU by each of the set of avatars.

10. The computer system of claim 7, the module for monitoring and deriving being further configured to derive demographic information of a user of each of the set of avatars based on at least one of: an attribute of a user of each of the set of avatars, a hardware configuration of the computer being used to control each of the set of avatars, recent history of web pages visited, a time of day for peak web usage, and contact information.

11. The demographic tracking utility according to claim 10, the module for monitoring and deriving being further configured to derive the demographic information of a user of each of the set of avatars from at least one third party source.

12. A computer-readable storage device storing computer instructions, which when executed by a demographic tracking utility, which is added to, and enables a computer system to track avatar demographics within a Virtual Universe (VU) in a networked computing environment, the computer instructions comprising:

overlaying a multidimensional grid on a region of the VU;

defining a multidimensional area of effective avatar impression surrounding a virtual advertisement;

partitioning the multidimensional grid into a plurality of cells, at least one of the plurality of cells corresponding in size to the multidimensional area of effective avatar impression surrounding a virtual advertisement;

tracking usage of a set of avatars within the region using the multidimensional grid, wherein the usage of the set of avatars is implemented via client computing devices;

monitoring and deriving avatar usage information based on the tracked usage of the set of avatars;

aggregating and processing the avatar usage information to determine demographics data of a user of each of the set of avatars, wherein each datum of the demographics data is associated with a script affecting rendering of an avatar, associated with a user, of the set of users; and displaying the multidimensional grid along with a representation of the effective avatar impression for each of plurality of cells, which are dimensioned based on the avatar usage information and the aggregated demographics data, the representation of the effective avatar impression comprising one or more of the following: an overlay map that is that is color-coded according to a number of avatars within each of the plurality of cells, and a numerical graphic displaying the number of avatars within one or more of the plurality of cells;

wherein the computer instructions further comprise instructions to utilize a set of databases to implement the method, the set of databases comprising:

a virtual region database comprising demographic information about objects, texts, and scripts associated with the virtual content in the virtual region, an active avatars database comprising a list of avatars, of the set of avatars, that are online in the virtual universe, a user database comprising information on the set of users, the information comprising at least one of: names, email addresses, locales, interests, ages, and preferences, a user information database comprising billing information for taking part in transactions, and an asset owner database comprising information relating to ownership of assets in the VU.

13. The computer-readable storage device according to claim 12, the computer instructions for tracking further comprising computer instructions for recording a quantity of visits to the region.

14. The computer-readable storage device according to claim 12, the computer instructions for deriving further comprising computer instructions for identifying a user of each of the set of avatars based on at least one of: an identity of a computer being used to control each of the set of avatars, an Internet Protocol (IP) address of the computer, or a path taken through the VU by each of the set of avatars.

15. The computer-readable storage device according to claim 12, the computer instructions for monitoring and deriving further comprising computer instructions for deriving demographic information of a user of each of the set of avatars based on at least one of: an attribute of a user of each of the set of avatars, a hardware configuration of the computer being used to control each of the set of avatars, recent history of web pages visited, a time of day for peak web usage, and contact information.

16. The computer-readable storage device according to claim 15, the computer instructions for monitoring and deriving further comprising computer instructions for deriving the demographic information of a user of each of the set of avatars from third party sources.

17. A method for deploying a Virtual Universe (VU) via a computer infrastructure, comprising the computer implemented steps of:

overlaying a multidimensional grid on a region of the VU by executing a demographic tracking utility containing a set of uniquely configured data processing elements, wherein the demographic tracking utility is implemented into an existing computer system;

defining, by the demographic tracking utility, a multidimensional area of effective avatar impression surrounding a virtual advertisement;

partitioning, by the demographic tracking utility, the multidimensional grid into a plurality of cells, at least one of the plurality of cells corresponding in size to the multidimensional area of effective avatar impression surrounding a virtual advertisement;

tracking, by the demographic tracking utility, usage of a set of avatars within the region using the multidimensional grid, wherein the usage of the set of avatars is implemented via client computing devices;

monitoring and deriving, by the demographic tracking utility, avatar usage information based on the tracked usage of the set of avatars;

aggregating and processing, by the demographic tracking utility, the avatar usage information to determine demographics data of a user of each of the set of avatars, wherein each datum of the demographics data is associated with a script affecting rendering of an avatar, associated with a user, of the set of users; and displaying, by the demographic tracking utility, the multidimensional grid along with a representation of the effective avatar impression for each of plurality of cells, which are dimensioned based on the avatar usage information and the aggregated demographics data, the representation of the effective avatar impression comprising one or more of the following: an overlay map that is that is color-coded according to a number of avatars within each of the plurality of cells, and a numerical graphic displaying the number of avatars within one or more of the plurality of cells;

wherein the computer infrastructure comprises:

a server array comprising a plurality of servers each responsible for managing a portion of virtual content within the VU, and a set of databases comprising:

a virtual region database comprising demographic information about objects, texts, and scripts associated with the virtual content in the virtual region, an active avatars database comprising a list of avatars, of the set of avatars, that are online in the virtual universe, a user database comprising information on the set of users, the information comprising at least one of: names, email addresses, locales, interests, ages, and preferences, a user information database comprising billing information for taking part in transactions, and an asset owner database comprising information relating to ownership of assets in the VU.

18. The method according to claim 1, further comprising relocating the virtual advertisement based on the number of avatars within one or more of the plurality of cells.

19. The method according to claim 1, wherein the representation of the effective avatar impression comprises a translucent frame displayed over one or more of the plurality of cells, wherein the translucent frame may be moved between cells of the plurality of cells, and wherein the translucent frame displays the number of avatars within the one or more of the plurality of cells.

\* \* \* \* \*